INVENTOR.
ROBERT F. GOLDEN
BY Hudson, Boughton,
Williams, David & Hoffmann.
ATTORNEYS Patented Aug. 10, 1954

2,685,719

UNITED STATES PATENT OFFICE 2,685,719

CLAMPING DEVICE

Robert F. Golden, Canton, Ohio, assignor to Eaton Manufacturing Company, Cleveland, Ohio, a corporation of Ohio Application June 21, 1952, Serial No. 294,891

5 Claims. (Cl. 24—20)

This invention relates to clamping devices and, more particularly, to a novel form of clamping device of the self contracting spring wire type. This novel clamping device can be applied to various uses, but is especially suitable as a hose clamp and is hereinafter described as such, but without intention of limiting the device precisely to that use.

An object of the present invention is to provide a novel clamping device of the self contracting spring wire type which is of a very simple form, such that it can be rapidly and economically produced and can be quickly and easily installed.

Another object of the invention is to provide a clamp of this general character in which the end portions of the spring wire loop define actuating arms extending outwardly in crossed relation to each other and in which the expanded condition of the clamp provides a loop opening of a size and shape to readily receive a hose or the like to be gripped by the clamp.

Still another object is to provide a clamp of the character referred to in which the actuating arms are formed as integral extensions of the ring portion of the clamp with portions of such arms curved in the same direction and to substantially the same radius of curvature as the ring portion of the clamp, such that when the clamp is in its gripping condition the ring portion defines a clamp opening of a truly circular shape and applies a substantially uniform clamping pressure at all points around the periphery of the member being gripped.

Additionally, this invention provides a novel clamp of the character mentioned above in which junction portions of the same radius of curvature as the ring portion connect the actuating arms with such ring portion and in which the clamp, in its free condition, defines an oval clamp opening with the curved junction portions of the arms extending outwardly from the point of crossing relation of the arms.

It is, likewise, an object of this invention to provide a self contracting spring wire hose clamp defined by a single loop of such wire and having end portions extending outwardly therefrom in crossing relation and in which the arms constitute extensions of the ends of the ring portion of the loop and are curved in the same direction and at the same radius of curvature as said ring portion, said clamp in its free condition having an oval or egg shape in which the curved portions of the arm extend outwardly from the point of said crossing relation such that when the clamp is in a partially expanded or gripping condition, said ring portion and curved arm portions together define a substantially truly circular clamp opening.

Other objects and advantages of the invention will be apparent in the following detailed description and in the accompanying sheet of drawing in which.

Figure 1:
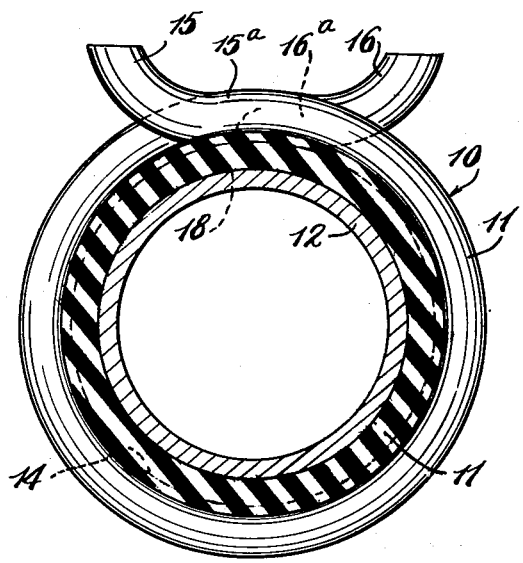
Fig. 1 is an assembly view showing the novel clamp in use and in its clamping condition for connecting a hose, or the like, with a substantially rigid tubular member.

As one practical embodiment of this invention, the drawings show a clamp 10 which can be used to advantage as a hose clamp, as illustrated in Fig. 1. As here shown, the clamp 10 is disposed in surrounding relation to a hose 11 of a predetermined size or diameter and serves the purpose of applying clamping pressure to the hose for connecting the same to a rigid tubular member or nipple 12 over which the hose extends in telescoping relation.

The clamp 10 is made of spring wire stock and is suitably hardened so as to be resilient in character with an inherent spring action rendering the clamp self contracting for applying the above-mentioned clamping force to the hose 11, or to any other member or article to which the clamp is applied.

The novel clamp 10 comprises a ring portion 13 defining a clamp opening 14, and a pair of arms 15 and 16 connected with opposite ends of the ring portion 13 and extending outwardly in substantially opposite directions and in a crossing or overlapping relation to each other. The arms 15 and 16 constitute actuating members by which an expanding force can be applied to the ends of the ring member 13 for flexing the clamp to an expanded or open condition, such as that shown in Fig. 5, and in which condition the clamp and the hose 11, or other member to be engaged thereby, can be readily brought into assembled relation. The release of the actuating force thus applied to the arms 15 and 16, permits the spring action of the clamp to contract the ring portion 13 to the condition shown in Fig. 2, in which the final shape of the clamp opening will be substantially truly circular and will apply a substantially uniform clamping force to the hose 11 at all points around the outer periphery thereof.

In spring wire clamps of this general type, difficulty has been experienced heretofore in various ways, for example one difficulty has been that in its clamping condition, the clamp is not truly circular and does not apply a uniform clamping force at all points around the periphery of the hose to which the clamp has been applied. Another such difficulty is that in the expanded or open condition of the clamp, the ends of the ring portion forming the actuating arms, break or interrupt the circular contour of the clamp opening such that the clamp cannot be readily moved into an applied position in surrounding relation to the hose.

Figure 2:
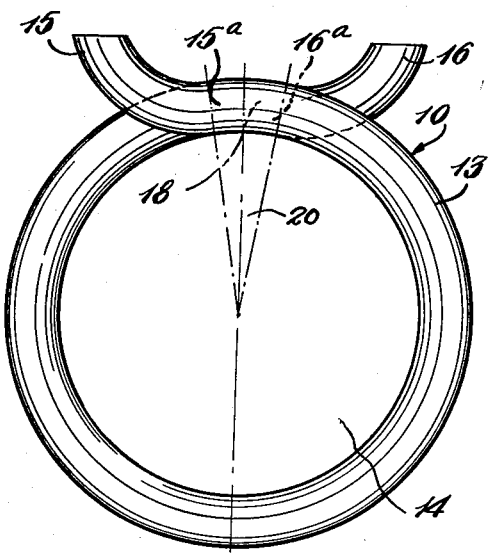
Fig. 2 is an end elevation of the clamp in detached relation, but with the clamp shown in its partially expanded or clamping condition.

In the novel clamp 10, the arms 15 and 16 are formed by integral extensions of the ring portion 13 and are of a curved shape such that when the clamp is in its gripping condition, illustrated in Fig. 2, the clamp opening 14 will be substantially truly circular in shape and will result in the above-explained desired uniform clamping pressure being applied at all points around the outer periphery of the hose 11.

The arms 15 and 15 are connected with the ends of the ring portion 13 by junction portions 15a and 16a and it is the curved shape of these junction portions which permits the attainment of the substantially truly circular final shape for the clamp opening and the improved uniform clamping action just described above. As shown in the drawings, the junction portions 15a and 16a are curved in the same direction as the ring portion 13 and at substantially the same radius of curvature.

Figure 4:
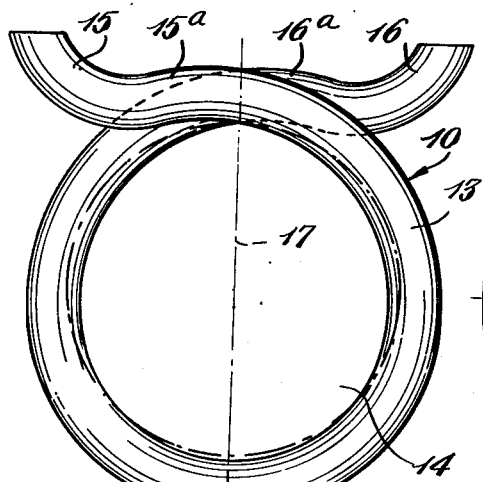
Fig. 4 is an end elevation of the clamp showing the same in detached relation and in its free or fully contracted condition.

The curved shape of the junction portions 15a and 16a can be further described by reference to the free condition of the clamp, as shown in Fig. 4. In this free condition of the clamp, the ring portion 13 defines a clamp opening 14 which is oval in shape and is substantially symmetrical with respect to a major axis 17. The shape of the clamp 10 in its free or fully contracted condition is such that the oval or egg shaped clamp opening 14 has its major axis 17 extending substantially through the point of crossing relation of the arms 15 and 16. The shape of the clamp 10, in this free condition, is also such that the curved junction portions 15a and 16a of the arms 15 and 16, extend laterally outwardly in substantially opposite directions from the ring member 13 and from the point at which the major axis 17 intersects the point or area 18 of crossing relation of the arms.

Figure 5:
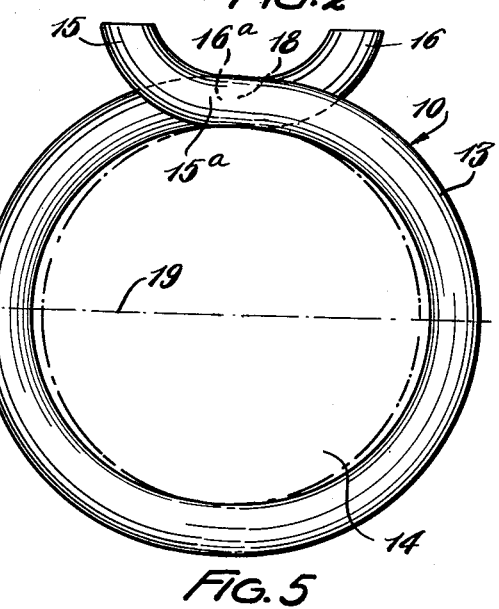
Fig. 5 is an end elevation of the clamp showing the same in detached relation and in its open or substantially fully expanded condition.
Figure 3:
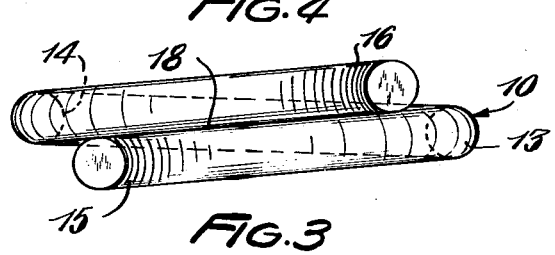
Fig. 3 is an edge view of the clamp while in such clamping condition.

When the clamp 10 is flexed to its open or substantially fully expanded condition, shown in Fig. 5, by an expanding force applied to the outer ends or extremities of the actuating arms 15 and 16, the clamp opening assumes another oval shape in which this opening is symmetrical about a major axis 19 extending substantially normal to the axis 17. Because of the curved shape of the junction portions 15a and 16a of the actuating arms 15 and 16, no part of these arms will extend into the clamp opening 14 or otherwise break the circular continuity of this clamp opening. The fully expanded condition of the clamp 10 is, therefore, one in which the clamp opening 14 will be entirely unobstructed and will permit a free and easy relative telescoping movement between the clamp and the hose 11 for locating the clamp in surrounding relation to the latter.

When the expanded clamp 10 is released and assumes its partially expanded or clamping condition, shown in Figs. 1 and 2, the actuating arms 15 and 16 assume a final position intermediate the positions shown in Figs. 4 and 5 and in which final position at least parts of the curved junction portions 15a and 16a are included in and define portions of the truly circular shape of the final clamp opening 14. At this time, the perimeter of the final clamp opening is defined by the ring portion 13 and by more or less of the junction portions 15a and 16a, such that the effective ring portion extends along a substantially truly circular contour of substantially exactly 360° of arcuate extent.

The clamp 10 is preferably, though not necessarily, made from a single loop or convolution of the spring wire stock with the intermediate portion of such length forming the body or ring portion 13 of the clamp and with the end portions of such length forming the actuating arms 15 and 16.

In the applied condition of the clamp, which is illustrated in Fig. 1 as being its normal expanded clamping condition, the ring portion 13 is shown indented slightly into the outer periphery of the hose 11 as the result of the clamping pressure being applied to the hose by this clamp.

The shape or curvature of the junction portions 15a and 16a of the actuating arms 15 and 16, can be further described with reference to Fig. 2 by pointing out that the arcuate length of these junction portions which conforms to the curvature of the ring portion 13, is preferably such that in the gripping condition of the clamp these curved junction portions overlap each other for an arcuate distance of approximately 10° as represented by the angle 20. The amount of ths overlap, however, can be varied somewhat and can be more or less than the 10° just mentioned, depending upon the workability of the wire stock and the size relationship of the wire stock and of the clamp with respect to a hose or other member of a predetermined size or diameter to which the clamp is intended to be applied.

From the accompanying drawing and the foregoing detailed description, it will now be readily understood that this invention provides a clamping device of the self contracting spring wire loop type which is of a very simple form adapted to be rapidly and economically produced and to be quickly and easily assembled on a hose or other member to which the clamping device is to be applied. It will now also be seen that the actuating arms of the clamp are of a novel shape such that in the open or fully expanded condition of the clamp, an unobstructed clamp opening will be made available for a free and easy assembling operation between the clamp and hose and in which the novel shape of the arms results in a substantially truly circular final shape for the clamp opening in which the ring portion of the clamp applies a substantially uniform clamping force to the hose at all points around the outer periphery thereof.

Although the clamping device of this invention has been illustrated and described herein to a somewhat detailed extent, it will be understood, of course, that the invention is not to be regarded as being limited correspondingly in scope, but includes all changes and modifications coming within the terms of the claims hereof.

Having thus described my invention, I claim:

1. A clamp comprising, a loop of spring stock wire having a free state substantially oval shape and terminating near its opposite end portions in arms extending in overlapping relation to one another and away from one another radially outwardly of the loop, a part of each end portion of the loop intermediate the extremity thereof and its point of overlap and lying outside of said free state substantially oval shape having in the free state of the clamp a radius of curvature equal to the radius of said loop when the clamp is in its normal expanded clamping condition.

2. A clamp comprising, a one-piece self contracting spring wire clamp loop made of a single piece of spring wire of substantially uniform cross-sectional thickness throughout its length and having a ring portion defining a loop opening and also having arms extending outwardly from the ends of said ring portion in crossing relation to each other, said ring portion having a free state substantially oval shape and portions of said arms lying outside of said free state substantially oval shape being curved in the same direction and at substantially the same radius of curvature as said ring portion.

3. A clamp of the character described comprising, a self contracting spring wire loop having a ring portion and arms extending outwardly from the ends of said ring portion in crossing relation to each other, said arms having junction portions integrally connecting the same with the ends of said ring portion, said loop in the free condition of the clamp defining a loop opening of oval shape and said junction portions extending outwardly beyond the point of crossing relation of said arms and lying outside of said oval shape, said junction portions being curved in the same direction and at substantially the same radius of curvature as said ring portion.

4. A clamp comprising, a self contracting spring wire loop having a ring portion and arms extending outwardly from the ends of said ring portion in crossing relation to each other, said arms having junction portions integrally connecting the same with the ends of said ring portion, said loop in the free condition of the clamp defining a loop opening of oval shape and said junction portions extending outwardly beyond the point of crossing relation of said arms and lying outside of said oval shape, said junction portions being curved in the same direction and at substantially the same radius of curvature as said ring portion, said loop in the gripping condition of the clamp defining a substantially truly circular loop opening of a full 360° extent with at least a part of said curved junction portions included in the 360° extent of said ring portion.

5. A hose clamp for application to connection hoses of internal combustion engine cooling systems and like heavy duty purposes comprising, a single convolution relatively stiff spring wire loop defining a loop opening and being self contracting from an expanded condition through a substantially truly circular gripping condition to a free condition, said loop having end portions extending outwardly therefrom in crossing relation and defining actuating arms which include curved junction portions by which the arms are connected in continuous relation with the ends of the loop, said loop in the free condition of the clamp having a shape defining an oval loop opening whose major axis extends substantially through the point of said crossing relation, said arms being of a length and said junction portions having a curvature of substantially the same radius as said loop during said substantially truly circular gripping condition, so that said loop in the fully expanded condition of the clamp defines an oval loop opening whose major axis extends substantially normal to the first-mentioned major axis and said loop in the gripping condition of the clamp defines a loop opening substantially truly circular in shape for a full 360° extent with at least a part of said curved junction portions included in said 360° extent, said curved junction portions in said free condition of the clamp lying beyond said point of crossing relation and outside of the free condition oval shape of said loop.

References Cited in the file of this patent

UNITED STATES PATENTS

| Number | Name | Date |
|---|---|---|
| 647,693 | Blantz | Apr. 17, 1900 |
| 2,006,358 | Kurkjian | July 2, 1935 |
| 2,180,271 | Arras | Nov. 14, 1939 |

FOREIGN PATENTS

| Number | Country | Date |
|---|---|---|
| 461,048 | Great Britain | Feb. 9, 1937 |